(12) United States Patent
Nakatake et al.

(10) Patent No.: US 10,538,241 B2
(45) Date of Patent: Jan. 21, 2020

(54) VEHICLE FRONT-WHEEL TURNING CONTROL APPARATUS

(71) Applicant: SUBARU CORPORATION, Tokyo (JP)

(72) Inventors: Masato Nakatake, Tokyo (JP); Yoshiaki Utsugi, Tokyo (JP); Shinji Matsushita, Tokyo (JP); Tsukasa Sato, Tokyo (JP); Toshi Ishida, Tokyo (JP); Hajime Terasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 218 days.

(21) Appl. No.: 15/631,448

(22) Filed: Jun. 23, 2017

(65) Prior Publication Data

US 2018/0056994 A1 Mar. 1, 2018

(30) Foreign Application Priority Data

Aug. 25, 2016 (JP) .................................. 2016-164610

(51) Int. Cl.
*B60W 30/085* (2012.01)
*B60W 30/18* (2012.01)

(52) U.S. Cl.
CPC .... *B60W 30/085* (2013.01); *B60W 30/18109* (2013.01); *B60W 2550/10* (2013.01)

(58) Field of Classification Search
CPC ......... B60W 30/085; B60W 30/18109; B60W 30/09; B60W 2550/10
See application file for complete search history.

(56) References Cited

U.S. PATENT DOCUMENTS

| 8,991,544 B1* | 3/2015 | Stratten | ................... | B60R 19/04 |
| | | | | 180/274 |
| 2008/0023954 A1* | 1/2008 | Eichberger | .............. | B60R 19/00 |
| | | | | 280/784 |

(Continued)

FOREIGN PATENT DOCUMENTS

| JP | 2007-125997 | 5/2007 |
| JP | 2012-505118 A | 3/2012 |
| JP | 2016-2834 A | 1/2016 |

OTHER PUBLICATIONS

Japanese Office Action dated Apr. 3, 2018, in Japanese Patent Application No. 2016-164610 (3 pages with English translation).

*Primary Examiner* — Hunter B Lonsberry
*Assistant Examiner* — Donald J Wallace
(74) *Attorney, Agent, or Firm* — Smith, Gambrell & Russell, LLP

(57) ABSTRACT

A vehicle front-wheel turning control apparatus includes a drive force transmission path, a braking force controller, a detector, and a front-wheel turning controller. The detector detects one of occurred contact of the vehicle with respect to a forward object at an occurred contact position and unavoidable contact thereof at an unavoidable contact position. The front-wheel turning controller turns one, of the left and right front wheels, to which the drive force is transmitted, by causing the braking force controller to apply the braking force to the one of the left and right front wheels, on a basis of a state of the drive force transmitted to each of the left and right front wheels and one of the occurred and unavoidable contact positions, when the one of the occurred contact and the unavoidable contact is detected by the detector.

14 Claims, 9 Drawing Sheets

(56) References Cited

U.S. PATENT DOCUMENTS

| | | | |
|---|---|---|---|
| 2011/0264347 A1 | 10/2011 | Cetinkaya | |
| 2012/0283907 A1* | 11/2012 | Lee | B60T 8/17557 701/31.9 |
| 2016/0083015 A1* | 3/2016 | Kiyoshita | B62D 25/025 296/187.09 |
| 2016/0121884 A1* | 5/2016 | Ciotlos | B60W 30/085 701/41 |
| 2016/0280266 A1* | 9/2016 | Kawamata | B60W 10/184 |
| 2017/0144640 A1* | 5/2017 | Hattori | B60T 7/22 |
| 2017/0210381 A1* | 7/2017 | Nishimura | B60W 10/18 |
| 2017/0291602 A1* | 10/2017 | Newman | B60W 50/16 |
| 2018/0029592 A1* | 2/2018 | Trombley | B60W 10/184 |

* cited by examiner

| XNOR | | CONTACT ON RIGHT SIDE | |
|---|---|---|---|
| | | T | F |
| FORWARD DRIVE FORCE | T | T | F |
| | F | F | T | ically difficult to
turn the front wheel in an extremely short time of the contact
VEHICLE FRONT-WHEEL TURNING CONTROL APPARATUS

CROSS-REFERENCE TO RELATED APPLICATIONS

The present application claims priority from Japanese Patent Application No. 2016-164610 filed Aug. 25, 2016, the entire contents of which are hereby incorporated by reference.

BACKGROUND

The technology relates to a vehicle front-wheel turning control apparatus that turns a left front wheel and a right front wheel of a vehicle when the vehicle and an object that is present ahead of the vehicle come into contact with each other.

Various apparatuses have been developed and are being brought into wide use that automatically avoid contact between a vehicle and an object (a forward object) that is present ahead of the vehicle. The forward object may be, for example, another vehicle. However, it has not been possible yet to avoid the contact between the vehicle and the forward object in all cases. Under this situation, an apparatus has been developed that applies braking force to wheels of the vehicle when the vehicle and the forward object come into contact with each other or when it is unavoidable for the vehicle and the forward object to come into contact with each other. As such an apparatus, reference is made to Japanese Unexamined Patent Application Publication (Translation of PCT Application) (JP-T) No. 2012-505118 and Japanese Unexamined Patent Application Publication (JP-A) No. 2016-2834, for example. Referring to JP-T No. 2012-505118, an automatic braking apparatus identifies a contact position of a vehicle with respect to an object. When the vehicle comes into contact with the object in a region ahead of the vehicle, the automatic braking apparatus executes braking that is delayed compared to braking to be performed when the vehicle comes into contact with the object in a region in the rear of the vehicle. Referring to JP-A No. 2016-2834, when a vehicle and a forward object come into contact with each other in a state that the vehicle and the forward object are shifted from each other in a width direction, i.e., when so-called offset contact between the vehicle and the forward object occurs, an automatic braking control apparatus suppresses rotation of the vehicle by applying greater braking force to at least one wheel on side opposite to side on which the vehicle comes into contact with the forward object than to other wheels.

SUMMARY

When the offset contact described above occurs in particular, after a vehicle comes into contact with a forward object ahead of the vehicle, a front wheel of the vehicle on the side on which the vehicle has come into contact with the forward object largely moves rearward due to a load applied to that front wheel, and may reach an interior of the vehicle in some cases. In a case where the front wheel moves in such a manner, a rear part of the front wheel may be preferably oriented outward in a width direction of the vehicle. However, an apparatus achieving an operation of orienting the front wheel outward in the width direction of the vehicle has not been developed yet. Further, it is substantially difficult to turn the front wheel in an extremely short time of the contact even if an attempt is made to turn the front wheel by activating a steering device as in performing turning in a normal situation.

It is desirable to provide a vehicle front-wheel control apparatus that is able to turn, in an appropriate direction, a front wheel of a vehicle on the side on which the vehicle comes into contact with a forward object, even when the vehicle comes into offset contact with the forward object.

An aspect of the technology provides a vehicle front-wheel turning control apparatus for a vehicle with a left front wheel and a right front wheel, the vehicle front-wheel turning control apparatus including: a drive force transmission path configured to transmit drive force at least to each of the left front wheel and the right front wheel; a braking force controller that controls braking force at least of the left front wheel and the right front wheel independently of each other; a detector configured to detect one of occurred contact of the vehicle with respect to a forward object at an occurred contact position of the vehicle and unavoidable contact of the vehicle with respect to the forward object at an unavoidable contact position of the vehicle, the forward object being an object present ahead of the vehicle; and a front-wheel turning controller configured to turn one, of the left front wheel and the right front wheel, to which the drive force is transmitted, by causing the braking force controller to apply the braking force to the one of the left front wheel and the right front wheel, on a basis of a state of the drive force transmitted to each of the left front wheel and the right front wheel and one of the occurred contact position and the unavoidable contact position, when the one of the occurred contact of the vehicle with respect to the forward object and the unavoidable contact of the vehicle with respect to the forward object is detected by the detector.

DETAILED DESCRIPTION

One implementation described below refers to some examples of an apparatus and a method as some implementations of the technology. However, according to the technical concept of the technology, materials, shapes, arrangements, etc. of components are not limited to those described below. It should be appreciated that modifications and alterations may be made by persons skilled in the art without departing from the scope as defined by the appended claims.

Figure 1:
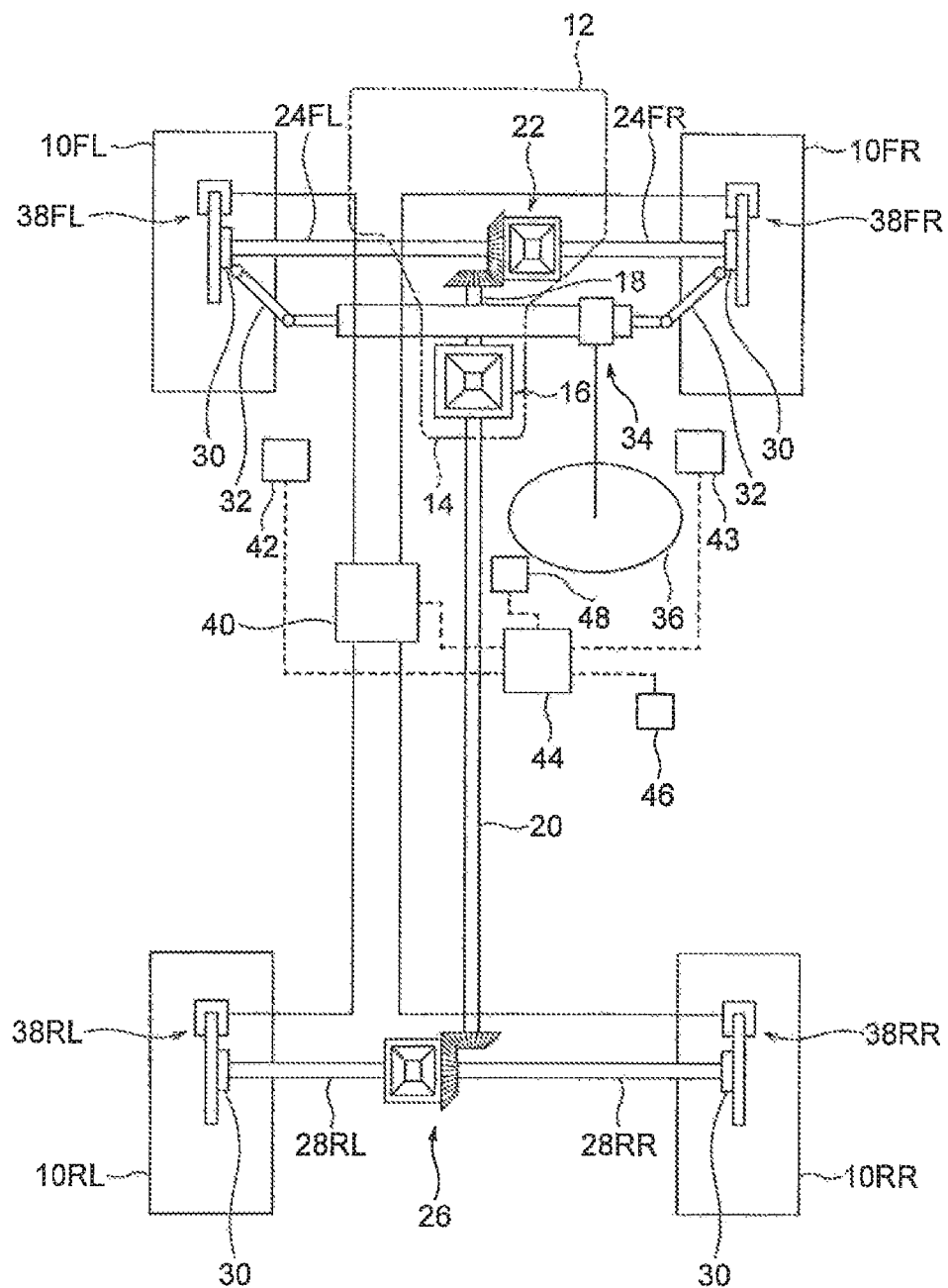
FIG. 1 is a schematic plan view of an example of a vehicle to which a vehicle front-wheel turning control apparatus according to one implementation of the technology is applied.

A vehicle front-wheel turning control apparatus according to one implementation of the technology is described in detail below with reference to the drawings. FIG. 1 is a schematic plan view of an example of a vehicle to which the vehicle front-wheel turning control apparatus according to one implementation of the technology is applied. Hereinafter, the term "forward", "ahead", and their variations refer to a direction in which the vehicle travels, i.e., an upward direction in FIG. 1. The term "rearward" and their variations refer to a direction opposite to the direction in which the vehicle travels, i.e., a downward direction in FIG. 1. The term "width direction" refers to a direction intersecting with the direction in which the vehicle travels, i.e., a left-right direction in FIG. 1. The vehicle may be a passenger car of a station wagon type, for example. A drive source of the vehicle may be an engine 12, for example. The engine 12 may be disposed inside an engine compartment provided at a forward part of the vehicle. The engine 12 may be coupled to a transmission 14 which is disposed in the rear of the engine 12. In this example, the engine 12 may be a horizontally-opposed four-cylinder engine, and the transmission 14 may be a stepped automatic transmission. The transmission 14 may include a center differential gear 16. The center differential gear 16 may transmit drive force to a left front wheel 10FL, a right front wheel 10FR, a left rear wheel 10RL, and a right rear wheel 10RR of the vehicle in a divided manner. The drive force divided by the center differential gear 16 may be transmitted to a front axle via a drive pinion shaft 18 and be also transmitted to a rear axle via components such as a propeller shaft 20.

In this example, a front differential gear 22 may be contained inside housing of the transmission 14. The front differential gear 22 may transmit the drive force, which has been transmitted to the front axle, to the left front wheel 10FL and the right front wheel 10FR in a divided manner. The drive force divided by the front differential gear 22 may be transmitted to the left front wheel 10FL and the right front wheel 10FR via a left front drive shaft 24FL and a right front drive shaft 24FR, respectively. The drive force transmitted to the rear axle may be divided by a rear differential gear and transmitted to the left rear wheel 10RL and the right rear wheel 10RR via a left rear drive shaft 28RL and a right rear drive shaft 28RR, respectively. The rear differential gear may be disposed at a rear part of the vehicle. In other words, the vehicle according to the present implementation may be an all-wheel-drive vehicle in which the drive force is transmitted to all of the left front wheel 10FL, the right front wheel 10FR, the left rear wheel 10RL, and the right rear wheel 10RR. It is to be noted that each of the engine 12 and the transmission 14 is not limited to the type described above and may be of any type.

A steering knuckle (a hub housing) 30 of each of the left front wheel 10FL and the right front wheel 10FR that serve as wheels to be turned of the vehicle may be coupled to a steering device 34 with a tie rod 32 in between. The steering device 34 may be designed to turn the left front wheel 10FL and the right front wheel 10FR that serve as the wheels to be turned, in accordance with an operation performed on a steering wheel 36. The steering device 34 may include components such as a known rack-and-pinion mechanism, for example. The steering device 34 may be a known hydraulic power steering device or a known electric steering device, for example.

The left front wheel 10FL, the right front wheel 10FR, the left rear wheel 10RL, and the right rear wheel 10RR may be attached to braking devices 38FL, 38FR, 38RL, and 38RR, respectively. Each of the braking devices 38FL, 38FR, 38RL, and 38RR may apply braking force to the corresponding one of the left front wheel 10FL, the right front wheel 10FR, the left rear wheel 10RL, and the right rear wheel 10RR. Each of the braking devices 38FL, 38FR, 38RL, and 38RR may be a known hydraulic braking device or a known electric braking device, for example. Accordingly, each of the left front wheel 10FL, the right front wheel 10FR, the left rear wheel 10RL, and the right rear wheel 10RR may be applied with the braking force in accordance with an operation performed on a brake pedal by a driver of the vehicle. The braking force to be applied to each of the braking devices 38FL, 38FR, 38RL, and 38RR described in this implementation may be adjusted and controlled by a braking force controlling device 40 independently of the driver's intention. The braking force controlling device 40 may be a known vertical dynamics control (VDC), for example. The braking force controlling device 40 of such a type makes it possible to apply the braking force to each of the left front wheel 10FL, the right front wheel 10FR, the left rear wheel 10RL, and the right rear wheel 10RR and adjust the applied braking force even when the driver is not pressing down the brake pedal. The braking force controlling device 40 of such a type also makes it possible to forcibly release the braking force applied to each of the left front wheel 10FL, the right front wheel 10FR, the left rear wheel 10RL, and the right rear wheel 10RR as with a known antilock brake system (ABS) device.

In this vehicle, the engine 12 may be controlled by an engine controller 42, the transmission 14 may be controlled by a transmission controller 43, and the braking force controlling device 40 may be controlled by a brake controller 44. The engine controller 42 may so control factors such as an amount of fuel injection and ignition timing that target engine torque is achieved, for example. The engine controller 42 may set the target engine torque on the basis of a throttle position and a rotational speed of the engine in accordance with a driving operation performed by the driver, for example. The transmission controller 43 may so control friction factors in the transmission 14 that a target transmission ratio (a target transmission level) is achieved, for example. The transmission controller 43 may set the target transmission ratio (the target transmission level) on the basis of a traveling speed of the vehicle and the throttle position, for example. The brake controller 44 may so control the braking force for each of the left front wheel 10FL, the right front wheel 10FR, the left rear wheel 10RL, and the right rear wheel 10RR that a target yaw rate is achieved, for example. The brake controller 44 may set the target yaw rate on the basis of a steering amount of the steering wheel 36 in accordance with a driving operation performed by the driver, for example.

Each of the engine controller 42, the transmission controller 43, and the brake controller 44 may include an arithmetic processor such as a microcomputer and have a high calculation process function, for example. Each of the engine controller 42, the transmission controller 43, and the brake controller 44 may therefore include an input-output unit, a storage, etc. in addition to a calculation processor, as with a computer system. Further, the engine controller 42, the transmission controller 43, and the brake controller 44 may be able to send, receive, and share information by performing mutual communication with each other. Through the mutual communication, information including information on an activation state of an unillustrated air bag may be sent, received, and shared between the engine controller 42, the transmission controller 43, and the brake controller 44. Examples of the information on the activation state of the air bag may include a position in the vehicle of the activated air bag and whether the activation of the air bag is completed. The vehicle in this implementation may be further provided with an acceleration sensor 46 that detects acceleration rate that acts on the vehicle. Examples of the acceleration rate to be detected may include an acceleration rate in a front-rear direction of the vehicle. A detection signal from the acceleration sensor 46 may be outputted to the brake controller 44.

Further, a forward recognizer 48 may be disposed at an upper part of a front window on the interior side of the vehicle, for example. The forward recognizer 48 may include a combination of two digital cameras, for example. On the basis of a three-dimensional image based on images of a region ahead of the vehicle which are captured by the two digital cameras, the forward recognizer 48 may identify objects present in the three-dimensional image and recognize a positional relationship between each of the objects and the vehicle. Examples of the objects present in the three-dimensional image may include a display such as a lane marker. Alternatively, the forward recognizer 48 may be a device that recognizes an object that is present ahead of the vehicle by means of a radar, for example.

A description is given below, with reference to a flowchart illustrated in FIG. 2, of a flow of a calculation process directed to a front-wheel turning control to be performed by the brake controller 44. The calculation process may be executed by means of a timer interrupt process every predetermined sampling period that is set in advance, for example. In this calculation process, first, in step S1, a contact state that is a state of contact of the vehicle with respect to the forward object may be detected on the basis of the information on the region ahead of the vehicle supplied from the forward recognizer 48, for example. Specifically, a possibility of the vehicle coming into contact with the forward object, a contact position of the vehicle with respect to the forward object, or any other information may be detected, for example. The contact position of the vehicle with respect to the forward object refers to a position at which the contact of the vehicle with respect to the forward object has occurred or is to occur. In one implementation, the contact position of the vehicle with respect to the forward object may serve as one of a "occurred contact position" and an "unavoidable contact position".

Thereafter, the flow may proceed to step S2, in which determination may be made as to whether the contact of the vehicle with respect to the forward object is unavoidable. When the contact of the vehicle with respect to the forward object is unavoidable (step S2: Y), the flow may proceed to step S3. In contrast, a return may be made when the contact of the vehicle with respect to the forward object is not unavoidable (step S2: N). The determination as to whether the contact of the vehicle with respect to the forward object is unavoidable may be made as follows. For example, a determination may be made that the contact of the vehicle with respect to the forward object is unavoidable when the traveling speed of the vehicle is equal to or greater than a threshold and a distance from the vehicle to the forward object is equal to or less than a threshold.

In step S3, all of the braking devices 38FL, 38FR, 38RL, and 38RR may be forcibly activated with the braking force controlling device 40. Upon the activating of all of the braking devices 38FL, 38FR, 38RL, and 38RR, maximum braking force may be applied to all of the left front wheel 10FL, the right front wheel 10FR, the left rear wheel 10RL, and the right rear wheel 10RR, or alternatively, braking force to an extent of not causing locking may be applied to all of the left front wheel 10FL, the right front wheel 10FR, the left rear wheel 10RL, and the right rear wheel 10RR, as with the ABS device.

Thereafter, the flow may proceed to step S4, in which information on the drive force transmitted to each of the left front wheel 10FL, the right front wheel 10FR, the left rear wheel 10RL, and the right rear wheel 10RR may be read through performing mutual communication with the engine controller 42, for example. Examples of the information on the drive force may include whether the drive force is in a direction of allowing the vehicle to travel forward or in a direction of allowing the vehicle to travel rearward. The drive force in the direction of allowing the vehicle to travel forward may be also referred to as positive drive force, and may be engine torque. The drive force in the direction of allowing the vehicle to travel rearward may be also referred to as negative drive force, and may be engine brake torque (back torque).

Thereafter, the flow may proceed to step S5, in which the exclusive NOR (XNOR) may be determined of the proposition that the contact position is on the right side of the vehicle and the proposition that the drive force is in the direction of allowing the vehicle to travel forward. FIG. 2 refers to an example in which the drive force is in the direction of allowing the vehicle to travel forward. When the XNOR is true (T) (step S5: T), the flow may proceed to step S6. When the XNOR is false (F) (step S5: F), the flow may proceed to step S7. FIG. 3 illustrates a control table of the XNOR. It is to be noted that the calculation process performed in step S5 described above may be a mere example for description purpose. The calculation process performed in step S5 may be any process as long as the process or the method allows the braking force to be applied to one of the left front wheel 10FL and the right front wheel 10FR, by which appropriate turning force is generated as a result for the other of the left front wheel 10FL and the right front wheel 10FR. In this example, the braking force may be also applied to the left rear wheel 10RL and the right rear wheel 10RR.

In step S6, the braking force for the right front braking device 38FR that is forcibly activated may be forcibly released. Thereafter, the flow may proceed to step S8.

In step S7, the braking force for the left front braking device 38FL that is forcibly activated may be forcibly released. Thereafter, the flow may proceed to step S8.

In step S8, determination may be made as to whether the contact of the vehicle with respect to the forward object is substantially completed. When the contact of the vehicle with respect to the forward object is completed (step S8: Y), the process may proceed to step S9. In contrast, when the contact of the vehicle with respect to the forward object is not completed yet (step S8: N), the brake controller 44 may be brought into a standby state. The determination that the contact of the vehicle with respect to the forward object is completed may be made, for example, on the basis of the fact that the acceleration rate in the front-rear direction detected by the acceleration sensor 46 exceeds a relatively-great threshold and thereafter descends to a value that is equal to or less than the threshold. The determination that the contact of the vehicle with respect to the forward object is completed may be also made, for example, on the basis of the fact that the activation of the air bag at the contact position of the vehicle is completed.

In step S9, the forcible interruption in braking may be brought to the end. Specifically, the application of the braking force to each of the left front wheel 10FL, the right front wheel 10FR, the left rear wheel 10RL, and the right rear wheel 10RR may be released. Thereafter, a return may be made.

According to the foregoing calculation process, when the determination is made that the contact of the vehicle with respect to the forward object is unavoidable, the braking force may be applied to all of the left front wheel 10FL, the right front wheel 10FR, the left rear wheel 10RL, and the right rear wheel 10RR by forcibly activating all of the braking devices 38FL, 38FR, 38RL, and 38RR, following which the braking force applied to one of the left front wheel 10FL and the right front wheel 10FR may be released on the basis of the state of the drive force transmitted to each of the left front wheel 10FL and the right front wheel 10FR and of the contact position of the vehicle and the forward object. In this state, the braking force may be applied to the other of the left front wheel 10FL and the right front wheel 10FR and both of the left rear wheel 10RL and the right rear wheel 10RR. Specifically, under a condition that the contact position of the vehicle with respect to the forward object is on the right side of the vehicle and the drive force is the forward drive force, the braking force may be applied not to the right front wheel 10FR but to each of the left front wheel 10FL, the left rear wheel 10RL, and the right rear wheel 10RR. Under a condition that the contact position of the vehicle with respect to the forward object is on the right side of the vehicle and the drive force is the rearward drive force, the braking force may be applied not to the left front wheel 10FL but to each of the right front wheel 10FR, the left rear wheel 10RL, and the right rear wheel 10RR. Alternatively, under a condition that the contact position of the vehicle with respect to the forward object is on the left side of the vehicle and the drive force is the forward drive force, the braking force may be applied not to the left front wheel 10FL but to each of the right front wheel 10FR, the left rear wheel 10RL, and the right rear wheel 10RR. Under a condition that the contact position of the vehicle with respect to the forward object is on the left side of the vehicle and the drive force is the rearward drive force, the braking force may be applied not to the right front wheel 10FR but to each of the left front wheel 10FL, the left rear wheel 10RL, and the right rear wheel 10RR.

The control of the braking force may be released when the contact of the vehicle with respect to the forward object is completed.

Figure 5:
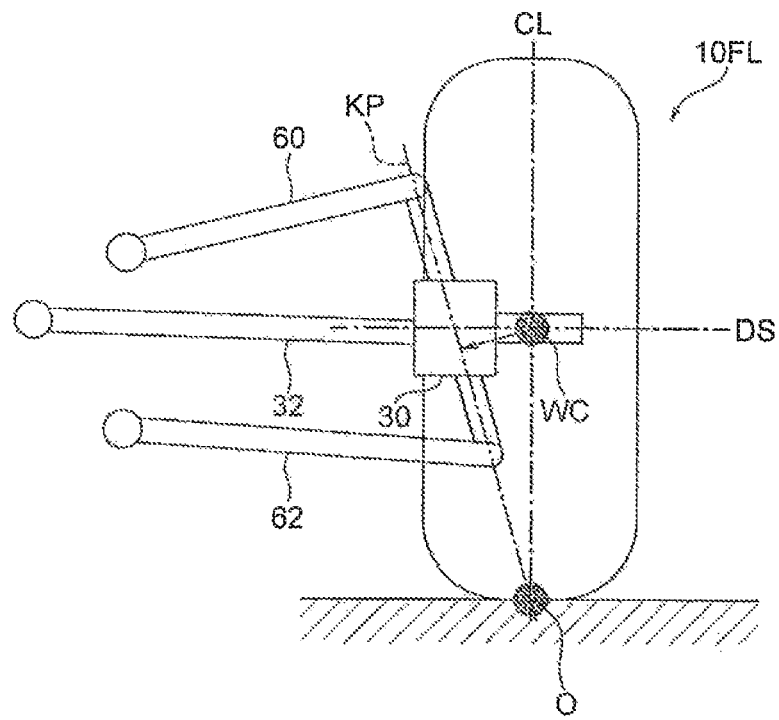
FIG. 5 is a front view of an example of the front-wheel suspension device illustrated in FIG. 4.

FIG. 4 is a perspective view of an example of a suspension device of the left front wheel 10FL that is a wheel to be turned and is to be used in the vehicle illustrated in FIG. 1. FIG. 5 is a front view of an example of the suspension device illustrated in FIG. 4. The suspension device is not limited to that of the type illustrated in the drawings. In this example, the suspension device may be a double wishbone suspension device for description purpose. The steering knuckle (the hub housing) 30 may be supported in a rotatable manner by an end of an upper A-arm 60 in the width direction and an end of a lower A-arm 62 in the width direction. The steering knuckle 30 may so support the left front wheel 10FL that the left front wheel 10FL is allowed to rotate freely. Accordingly, the steering knuckle 30, and therefore the left front wheel 10FL, may rotate around a straight line that connects a coupling point of the steering knuckle 30 or the left front wheel 10FL and the upper A-arm 60 and a coupling point of the steering knuckle 30 or the left front wheel 10FL and the lower A-arm 62, i.e., a straight line that connects the coupling points of the steering knuckle 30 or the left front wheel 10FL and the suspension device. Further, a rear end of the steering knuckle 30 or the left front wheel 10FL may be coupled to the tie rod 32, as described above. The left front wheel 10FL may be therefore turned by the steering device 34 around a connection shaft that connects the left front wheel 10FL, and the suspension device. This connection shaft serving as a turning axis (a rotation axis) may be a kingpin axis KP. The right front wheel 10FR may be turned in a manner similar to the foregoing manner in which the left front wheel 10FL is turned.

Figure 6:
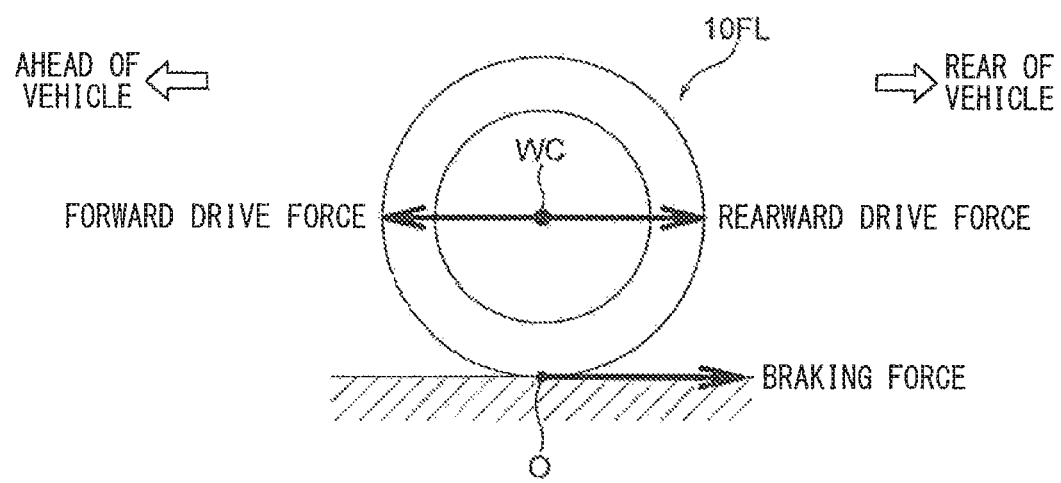
FIG. 6 describes an example of drive force and braking force that are applied to a driving wheel.

Referring to FIG. 6, the braking force provided by the left front braking device 38FL may act rearward on a ground point O at which the left front wheel 10FL is brought into contact with the ground. In contrast, the drive force, specifically, the positive drive force and the negative drive force, may act on a wheel center WC. The wheel center WC may be an intersection of an axle DS and a center axis CL of the left front wheel FL viewed from the front. It is to be noted that the center axis CL of the left front wheel FL viewed from the rear is the same as that viewed from the front. Out of the drive force that acts on the wheel center WC, the drive force (the positive drive force) that drives the vehicle to travel forward may act forward on the wheel center WC, and the drive force (the negative drive force) that drives the vehicle to travel rearward may act rearward on the wheel center WC.

Referring to FIG. 5, the kingpin axis KP may be located on inner side, in the width direction, with respect to the central axis CL of the left front wheel FL viewed from the front, i.e., with respect to the ground point O of the left front wheel 10FL (a tire), in the vicinity of the suspension device. This may be on the basis of a structural limitation deriving from the suspension device and the left front wheel 10FL. When the kingpin axis KP and the force that acts on the left front wheel 10FL are away from each other, the left front wheel 10FL may be turned as a result of presence of a so-called force couple. For example, when the kingpin axis KP and the ground point O, i.e., a point on which the braking force acts are shifted from each other on a surface on which the left front wheel 10FL is brought into contact with the ground, the turning force may act on the left front wheel 10FL every time the braking force acts. It may not be preferable that the turning is performed on the basis of this braking force. Therefore, a shift may be 0 (zero) or almost 0 (zero) between the kingpin axis KP and the ground point O on the surface on which the left front wheel 10FL is brought into contact with the ground. Such a shift between the kingpin axis KP and the ground point O on the surface on which the left front wheel 10FL is brought into contact may be sometimes referred to as a scrub radius or a kingpin offset.

In contrast, the wheel center WC that is a point of application of the drive force may be away from the kingpin axis KR. Accordingly, the left front wheel 10FL may be turned when the drive force acts with a moment arm corresponding to a distance from the kingpin axis KP to the wheel center WC. When the drive force is in the forward direction, i.e., when the drive force is the forward drive force, each of the left front wheel 10FL and the right front wheel 10FR may be so turned that the rear part of the vehicle may be oriented outward in the width direction. When the drive force is in the rearward direction, i.e., when the drive force is the rearward drive force, each of the left front wheel 10FL and the right front wheel 10FR may be so turned that the rear part of the vehicle may be oriented inward in the width direction.

Figure 7:
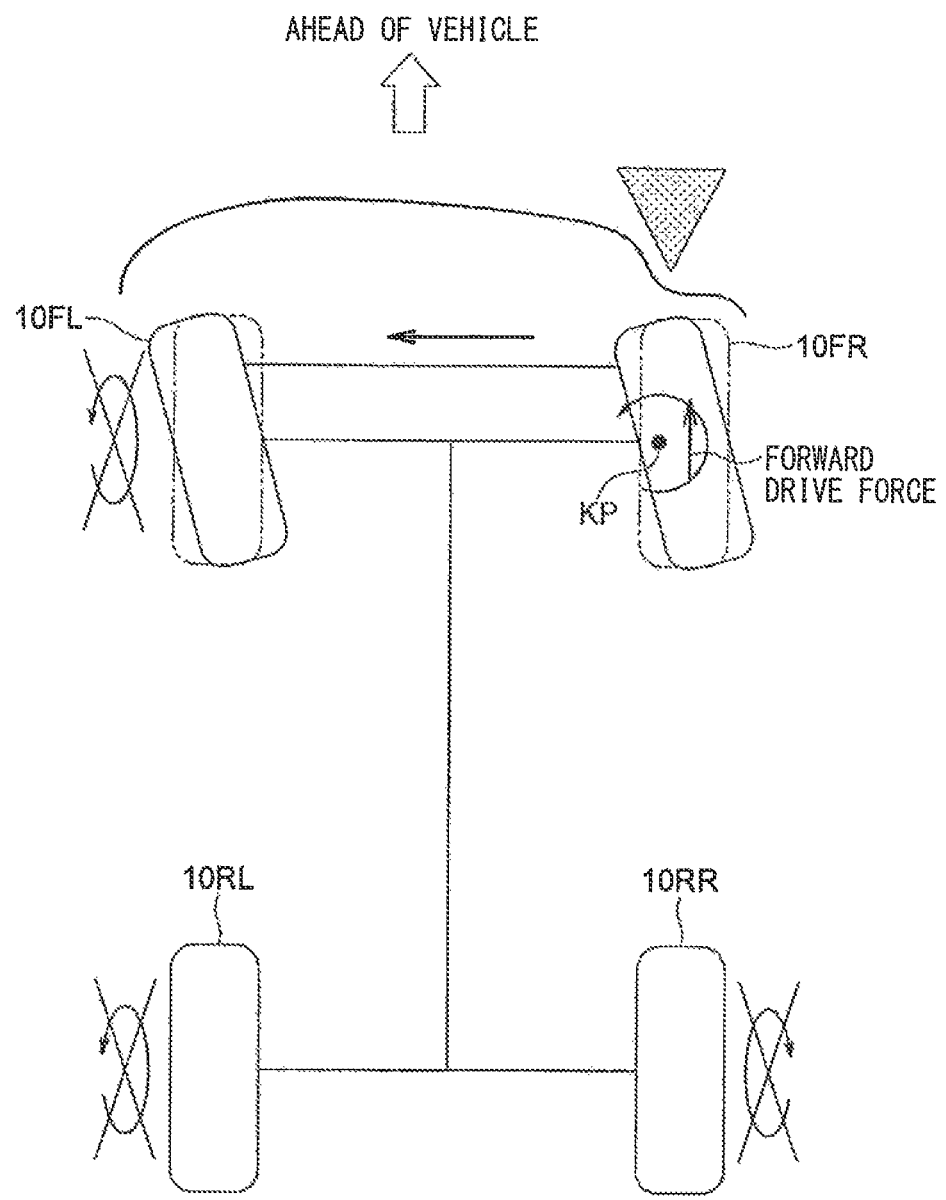
FIG. 7 describes an example working as a result of the calculation process illustrated in FIG. 2.

In the all-wheel-drive vehicle, the drive force may be transmitted to all of the left front wheel 10FL, the right front wheel 10FR, the left rear wheel 10RL, and the right rear wheel 10RR via the center differential gear 16, the front differential gear 22, and a rear differential gear, for example. Referring to FIG. 7, for example, under a condition that the contact position of the vehicle with respect to the forward object is on the right side of the vehicle and the drive force transmitted to each of the left front wheel 10FL, the right front wheel 10FR, the left rear wheel 10RL, and the right rear wheel 10RR is the forward drive force, the forward drive force may be transmitted only to the right front wheel 10FR upon application of the braking force to each of the left front wheel 10FL, the left rear wheel 10RL, and the right rear wheel 10RR. In a precise sense, it is not likely that no drive force is transmitted to each of the left front wheel 10FL, the left rear wheel 10RL, and the right rear wheel 10RR unless all of the left front wheel 10FL, the left rear wheel 10RL, and the right rear wheel 10RR are locked. Accordingly, the right front wheel 10FR on which the forward drive force acts may be so turned with the center of turning corresponding to the kingpin axis KP, that the rear part of the the right front wheel 10FR is oriented outward in the width direction. Upon this turning of the right front wheel 10FR, the left front wheel 10FL coupled to the right front wheel 10FR with the steering device 34 in between may be so turned that the rear part of the left front wheel 10FL is oriented inward in the width direction. This turning of the left front wheel 10FL may be referred to as torque steering herein, although the term "torque steering" is used herein in a manner slightly different from the general use of the term.

Figure 8:
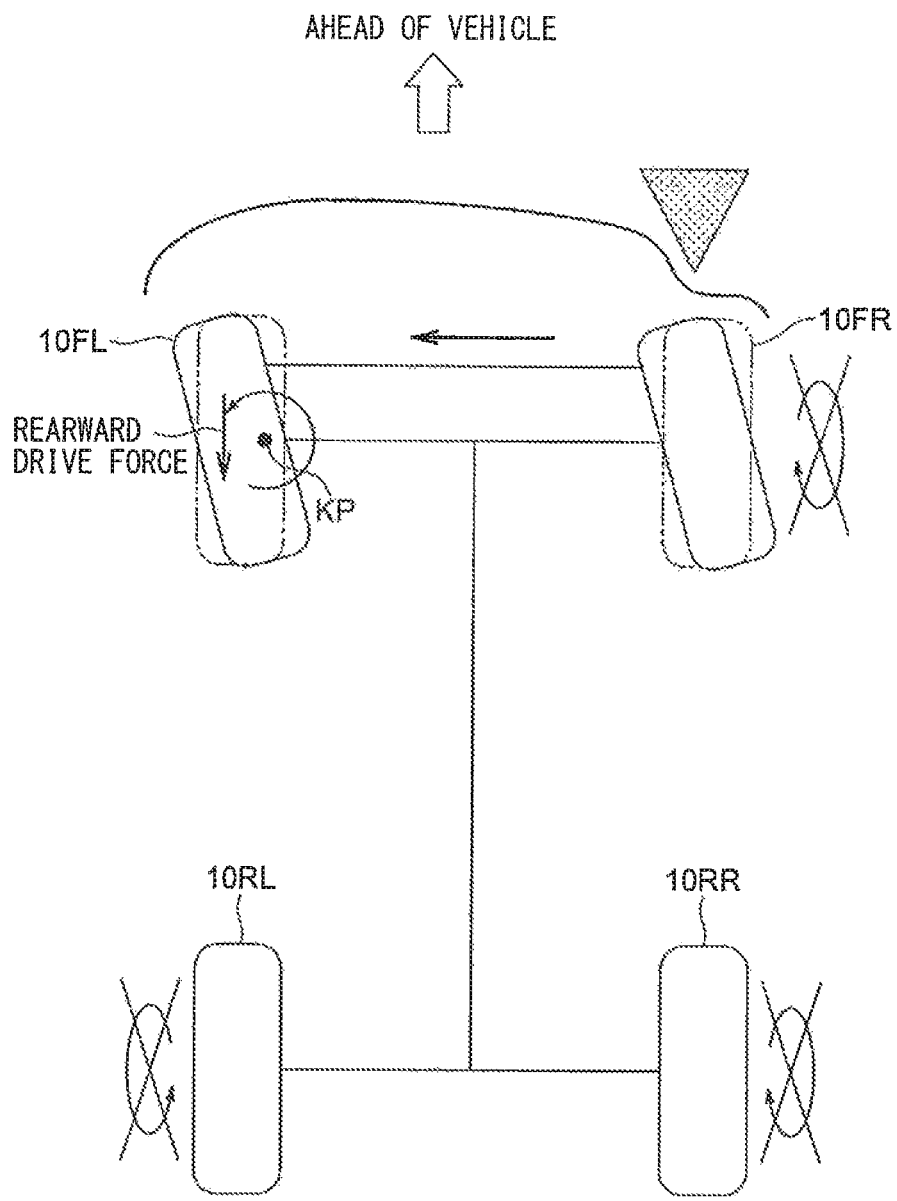
FIG. 8 also describes another example working as a result of the calculation process illustrated in FIG. 2.

In contrast, referring to FIG. 8, for example, under a condition that the contact position of the vehicle with respect to the forward object is on the right side of the vehicle and the drive force transmitted to each of the left front wheel 10FL, the right front wheel 10FR, the left rear wheel 10RL, and the right rear wheel 1ORR is the rearward drive force, the rearward drive force may be transmitted only to the left front wheel 10FL upon application of the braking force to each of the right front wheel 10FR, the left rear wheel 10RL, and the right rear wheel 10RR. In a precise sense, it is not likely that no drive force is transmitted to each of the left front wheel 10FL, the right front wheel 10FR, the left rear wheel 10RL, and the right rear wheel 10RR unless all of the right front wheel 10FR, the left rear wheel 10RL, and the right rear wheel 10RR are locked. Accordingly, the left front wheel 10FL on which the rearward drive force acts may be so turned with the center of turning corresponding to the kingpin axis KP that the rear part of the the left front wheel 10FL is oriented inward in the width direction. Upon this turning of the left front wheel 10FL, the right front wheel 10FR coupled to the left front wheel 10FL with the steering device 34 in between may be so turned that the rear part of the the right front wheel 10FR is oriented outward in the width direction.

In both of the foregoing cases, the contact position of the vehicle with respect to the forward object is on the right side of the vehicle. It may be therefore preferable that the turning be so performed that the rear part of the right front wheel 10FR is oriented outward in the width direction. Accordingly, under a condition that the contact position of the vehicle with respect to the forward object is on the right side of the vehicle and the drive force is the forward drive force, the braking force may be applied to each of the left front wheel 10FL, the left rear wheel 10RL, and the right rear wheel 10RR. Under a condition that the contact position of the vehicle with respect to the forward object is on the right side of the vehicle and the drive force is the rearward drive force, the braking force may be applied to each of the right front wheel 10FR, the left rear wheel 10RL, and the right rear wheel 10RR. It is thereby possible, in both of the foregoing cases, to so perform the turning that the rear part of the right front wheel 10FR is oriented outward in the width direction. The right front wheel 10FR may be likely to move rearward due to the load applied on the right front wheel 10FR upon the contact of the vehicle with respect to the forward object. In contrast, under a condition that the contact position of the vehicle with respect to the forward object is on the left side of the vehicle and the drive force is the forward drive force, the braking force may be applied to each of the right front wheel 10FR, the left rear wheel 10RL, and the right rear wheel 10RR. Under a condition that the contact position of the vehicle and the forward object is on the left side of the vehicle and the drive force is the rearward drive force, the braking force may be applied to each of the left front wheel 10FL, the left rear wheel 10RL, and the right rear wheel 10RR. It is thereby possible, in both of the foregoing cases, to so perform the turning that the rear part of the left front wheel 10FL is oriented outward in the width direction. The left front wheel 10FL may be likely to move rearward due to the load applied on the left front wheel 10FL upon the contact of the vehicle with respect to the forward object.

Figure 2:
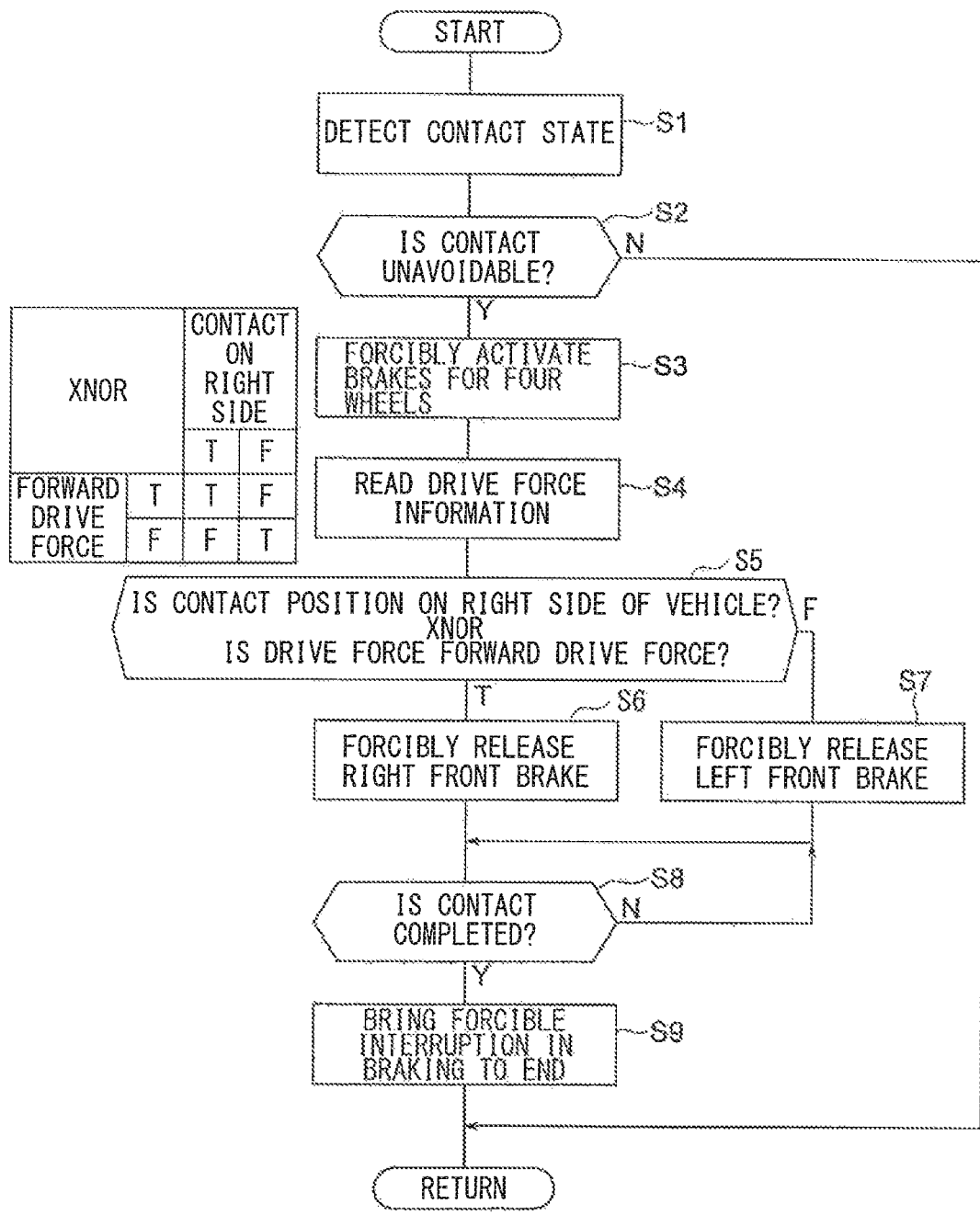
FIG. 2 is a flowchart of an example flow of a calculation process to be performed by a brake controller illustrated in FIG. 1.
Figures 3, 4:
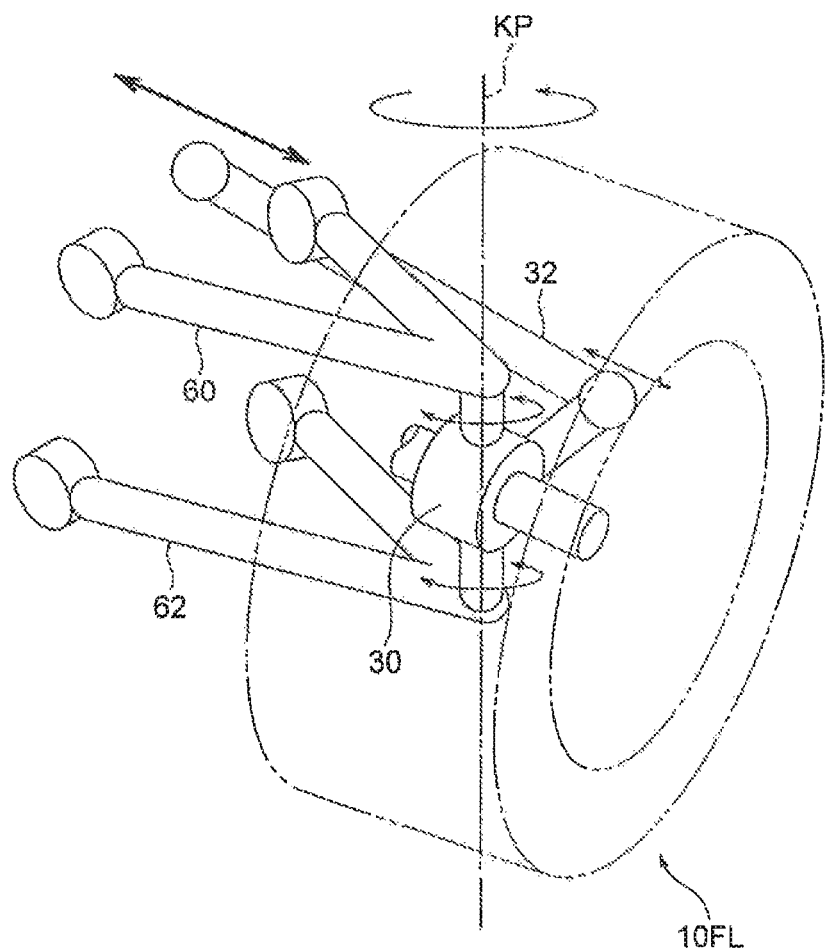
FIG. 3 describes an example of a control table to be used upon performing the calculation process illustrated in FIG. 2.
FIG. 4 is a perspective view of an example of a front-wheel suspension device to be used in the vehicle illustrated in FIG. 1.

In the calculation process illustrated in FIG. 2, under a condition that the contact position of the vehicle with respect to the forward object is on the right side of the vehicle and the drive force is the forward drive force, the braking force may be applied not to the right front wheel 10FR but to each of the left front wheel 10FL, the left rear wheel 10RL, and the right rear wheel 10RR. Under a condition that the contact position of the vehicle with respect to the forward object is on the right side of the vehicle, and the drive force is the rearward drive force, the braking force may be applied not to the left front wheel 10FL but to each of the right front wheel 10FR, the left rear wheel 10RL, and the right rear wheel 10RR. Under a condition that the contact position of the vehicle with respect to the forward object is on the left side of the vehicle and the drive force is the forward drive force, the braking force may be applied not to the left front wheel 10FL but to each of the right front wheel 10FR, the left rear wheel 10RL, and the right rear wheel 10RR. Under a condition that the contact position of the vehicle with respect to the forward object is on the left side of the vehicle and the drive force is the rearward drive force, the braking force may be applied not to the right front wheel 10FR but to each of the left front wheel 10FL, the left rear wheel 10RL, and the right rear wheel 10RR. The turning may be therefore so performed that the rear part of one of the left front wheel 10FL and the right front wheel 10FR, which is likely to move rearward due to the load applied to the one of the left front wheel 10FL and the right front wheel 10FR upon the contact between the vehicle and the forward object, is oriented outward in the width direction.

Further, in this example, the braking force may be applied also to the left rear wheel 10RL and the right rear wheel 10RR upon turning, by means of the drive force, one of the left front wheel 10FL and the right front wheel 10FR that is on the opposite side to the other of the left front wheel 10FL and the right front wheel 10FR applied with the braking force. In the all-wheel-drive vehicle, this contributes to concentrating the drive force that is likely to be transmitted also to the left rear wheel 10RL and the right rear wheel 10RR, to one of the left front wheel 10FL and the right front wheel 10FR that is to be turned by means of the drive force. The application of the braking force to the left rear wheel 10RL and the right rear wheel 10RR may decrease the traveling speed of the vehicle. The load due to the contact of the vehicle with respect to the forward object may be reduced in accordance with the amount of decrease in the traveling speed of the vehicle. Further, in this example, the braking force may be applied to all of the left front wheel 10FL, the right front wheel 10FR, the left rear wheel 10RL, and the right rear wheel 10RR before one of the left front wheel 10FL and the right front wheel 10FR may be turned by means of the drive force. The traveling speed of the vehicle is decreased during the application of the braking force to all of the left front wheel 10FL, the right front wheel 10FR, the left rear wheel 10RL, and the right rear wheel 10RR. The load due to the contact of the vehicle with respect to the forward object may be reduced in accordance with the amount of decrease in the traveling speed of the vehicle.

Figure 9:
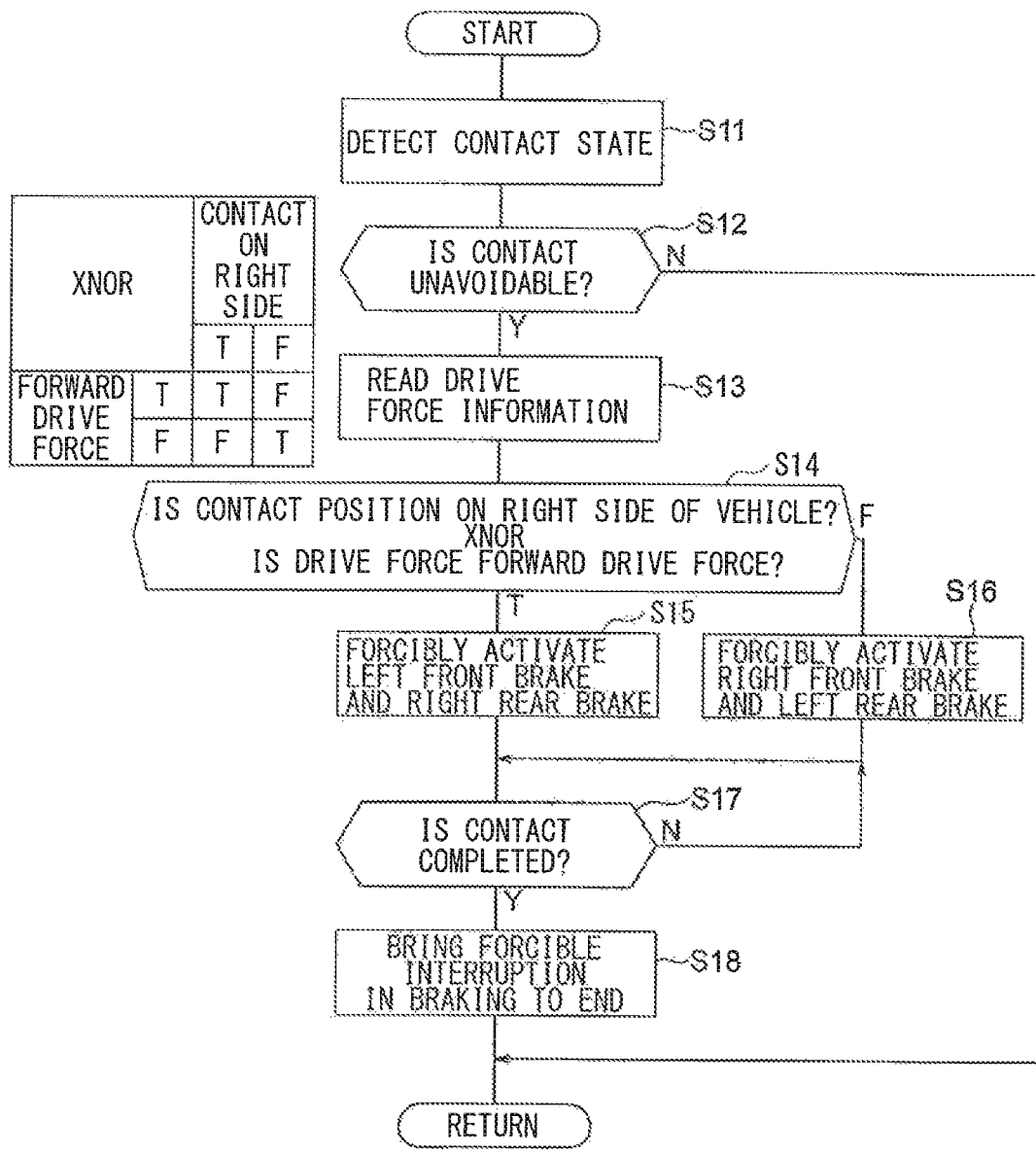
FIG. 9 is a flowchart of an example flow of a calculation process to be performed by a brake controller in a case where the vehicle is a front-wheel-drive vehicle.

FIG. 9 is a flowchart of an example flow of a calculation process to be performed by the brake controller 44 in a case where the vehicle is a front-wheel-drive vehicle, according to another implementation of the technology. According to this implementation, the vehicle may have a configuration similar to the configuration of the all-wheel-drive vehicle illustrated in FIG. 1 except that the center differential gear 16, the propeller shaft 20, the left rear drive shaft 28RL, and the right rear drive shaft 28RR are not provided, for example. As with the calculation process described referring to FIG. 2, the calculation process in this implementation may be executed by means of a timer interrupt process every predetermined sampling period that is set in advance, for example. In this calculation process, first, in step S11, as in step S1 of the calculation process illustrated in FIG. 2, a contact state that is a state of contact of the vehicle with respect to the forward object may be detected on the basis of the information on the region ahead of the vehicle supplied from the forward recognizer 48, for example. Specifically, a possibility of occurrence of the contact of the vehicle with respect to the forward object, the contact position of the vehicle with respect to the forward object, or any other information may be detected, for example.

Thereafter, the flow may proceed to step S12, in which, as in step S2 of the calculation process illustrated in FIG. 2, determination may be made as to whether the contact of the vehicle with respect to the forward object is unavoidable. When the contact of the vehicle with respect to the forward object is unavoidable (step S12: Y), the flow may proceed to step S13. When the contact of the vehicle with respect to the forward object is not unavoidable (step S12: N), a return may be made.

In step S13, as in step S4 of the calculation process illustrated in FIG. 2, information on the drive force transmitted to each of the left front wheel 10FL, the right front wheel 10FR, the left rear wheel 10RL, and the right rear wheel 10RR may be read through performing mutual communication with the engine controller 42, for example.

Thereafter, the flow may proceed to step S14, in which, as in step S5 of the calculation process illustrated in FIG. 2, the exclusive NOR (XNOR) may be determined of the proposition that the contact position is on the right side of the vehicle and the proposition that the drive force is in the direction of allowing the vehicle to travel forward. The drawings refer to an example in which the drive force is in the direction of allowing the vehicle to travel forward. When the XNOR is true (T) (step S14: T), the flow may proceed to step S15. When the XNOR is false (F) (step S14: F), the flow may proceed to step S16. A control table of the XNOR in this example may be the same as the control table illustrated in FIG. 3. It is to be noted that the calculation process performed in step S14 described above may also be mere example for description purpose. The calculation process performed in step S14 may be any process as long as the process or the method allows the braking force to be applied to one of the left front wheel 10FL and the right front wheel 10FR and allow appropriate turning force to be generated as a result for the other of the left front wheel 10FL and the right front wheel 10FR, as described later.

In step S15, the left front braking device 38FL and the right rear braking device 38RR may be forcibly activated. Thereafter, the flow may proceed to step S17. Upon the activating of the left front braking device 38FL and the right rear braking device 38RR, maximum braking force may be applied to each of the left front wheel 10FL and the right rear wheel 10RR, or alternatively, braking force to an extent of not causing locking may be applied to all of the left front wheel 10FL and the right rear wheel 10RR, as with the ABS device.

In step S16, each of the right front braking device 38FR and the left rear braking device 38RL may be forcibly activated. Thereafter, the flow may proceed to step S17. Upon the activating of the right front braking device 38FR and the left rear braking device 38RL, maximum braking force may be applied to each of the right front wheel 10FR and the left rear wheel 10RL, or alternatively, braking force to an extent of not causing locking may be applied to all of the right front wheel 10FR and the left rear wheel 10RL, as with the ABS device.

In step S17, as in step S8 of the calculation process illustrated in FIG. 2, determination may be made as to whether the contact of the vehicle with respect to the forward object is substantially completed. When the contact of the vehicle with respect to the forward object is completed (step S17: Y), the process may proceed to step S18. In contrast, when the contact of the vehicle with respect to the forward object is not completed yet (step S17: N), the brake controller 44 may be brought into a standby state.

In step S18, as in step S9 of the calculation process illustrated in FIG. 2, the forcible interruption in braking may be brought to the end. Specifically, the application of the braking force to each of the left front wheel 10FL, the right front wheel 10FR, the left rear wheel 10RL, and the right rear wheel 10RR may be released. Thereafter, a return may be made.

According to the foregoing calculation process in this implementation, when the determination is made that the contact of the vehicle with respect to the forward object is unavoidable, the braking force may be applied to one of the left front wheel 10FL and the right front wheel 10FR, and the braking force may be applied to one of the left rear wheel 10RL and the right rear wheel 10RR that is on the opposite side to the one of the left front wheel 10FL and the right front wheel 10FR applied with the braking force. This application of the braking force may be performed on the basis of the state of the drive three transmitted to the left front wheel 10FL and the right front wheel 10FR and the contact position of the vehicle with respect to the forward vehicle. Specifically, under a condition that the contact position of the vehicle with respect to the forward object is on the right side of the vehicle and the drive force is the forward drive force, the braking force may be applied to the left front wheel 10FL and the right rear wheel 10RR. Under a condition that the contact position of the vehicle with respect to the forward object is on the right side of the vehicle and the drive force is the rearward drive force, the braking force may be applied to the right front wheel 10FR and the left rear wheel 10RL. Alternatively, under a condition that the contact position of the vehicle with respect to the forward object is on the left side of the vehicle and the drive force is the forward drive force, the braking force may be applied to the right front wheel 10FR and the left rear wheel 10RL. Under a condition that the contact position of the vehicle with respect to the forward object is on the left side of the vehicle and the drive force is the rearward drive force, the braking force may be applied to the left front wheel 10FL and the right rear wheel 10RR. The control of the braking force may be released when the contact of the vehicle with respect to the forward object is completed.

Figure 10:
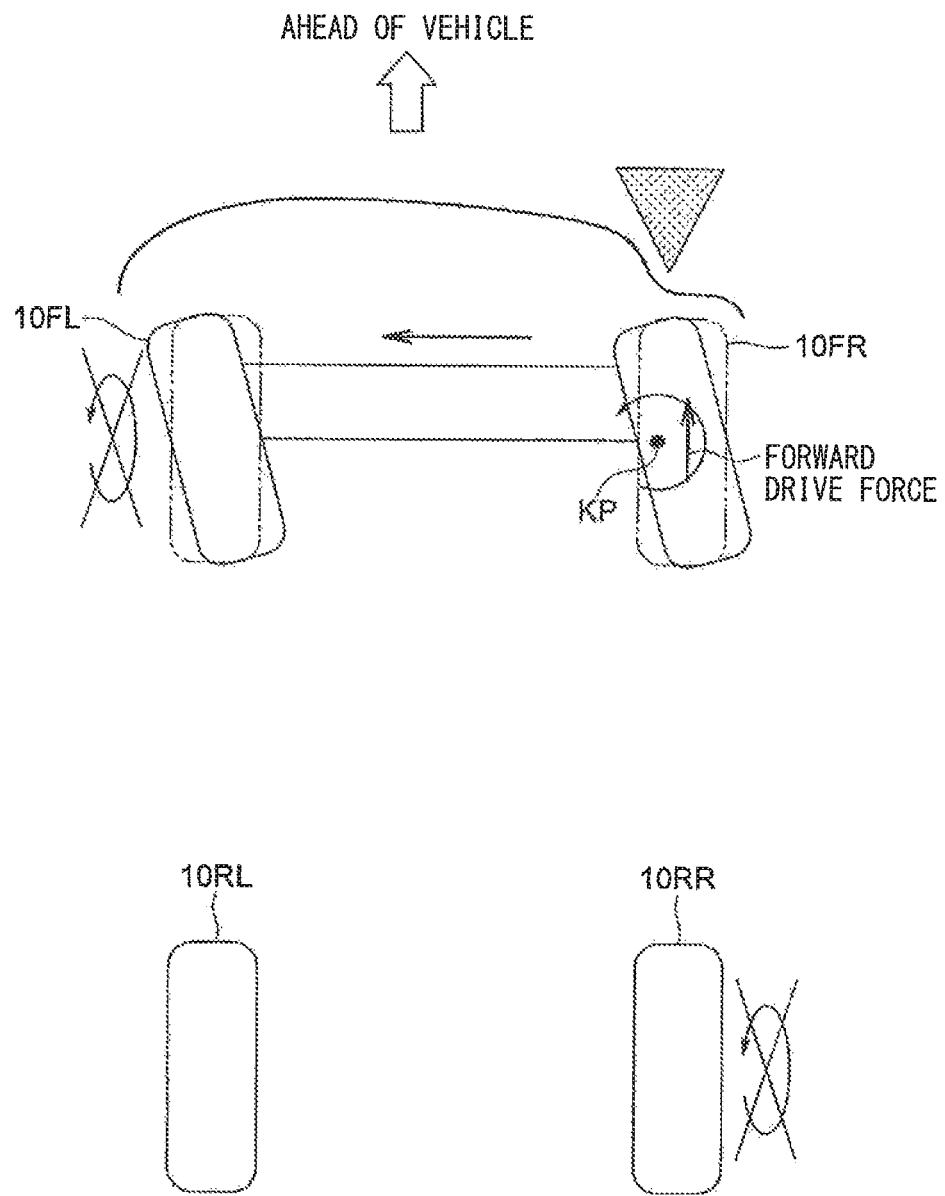
FIG. 10 describes an example working as a result of the calculation process illustrated in FIG. 9.

The vehicle described above is a front-wheel-drive vehicle. Accordingly, referring to FIG. 10, for example, under a condition that the contact position of the vehicle with respect to the forward object is on the right side of the vehicle and the drive force transmitted to each of the left front wheel 10FL and the right front wheel 10FR is the forward drive force, the forward drive force may be transmitted only to the right front wheel 10FR upon application of the braking force to the left front wheel 10FL. In a precise sense, it is not likely that no drive force is transmitted to the left front wheel 10FL unless the left front wheel 10FL is locked. Accordingly, the right front wheel 10FR on which the forward drive force acts may be so turned with the center of turning corresponding to the kingpin axis KP, that the rear part of the right front wheel 10FR is oriented outward in the width direction. Upon this turning of the right front wheel 10FR, the left front wheel 10FL coupled to the right front wheel 10FR with the steering device 34 in between may be so turned that the rear part of the left front wheel 10FL is oriented inward in the width direction.

Figure 11:
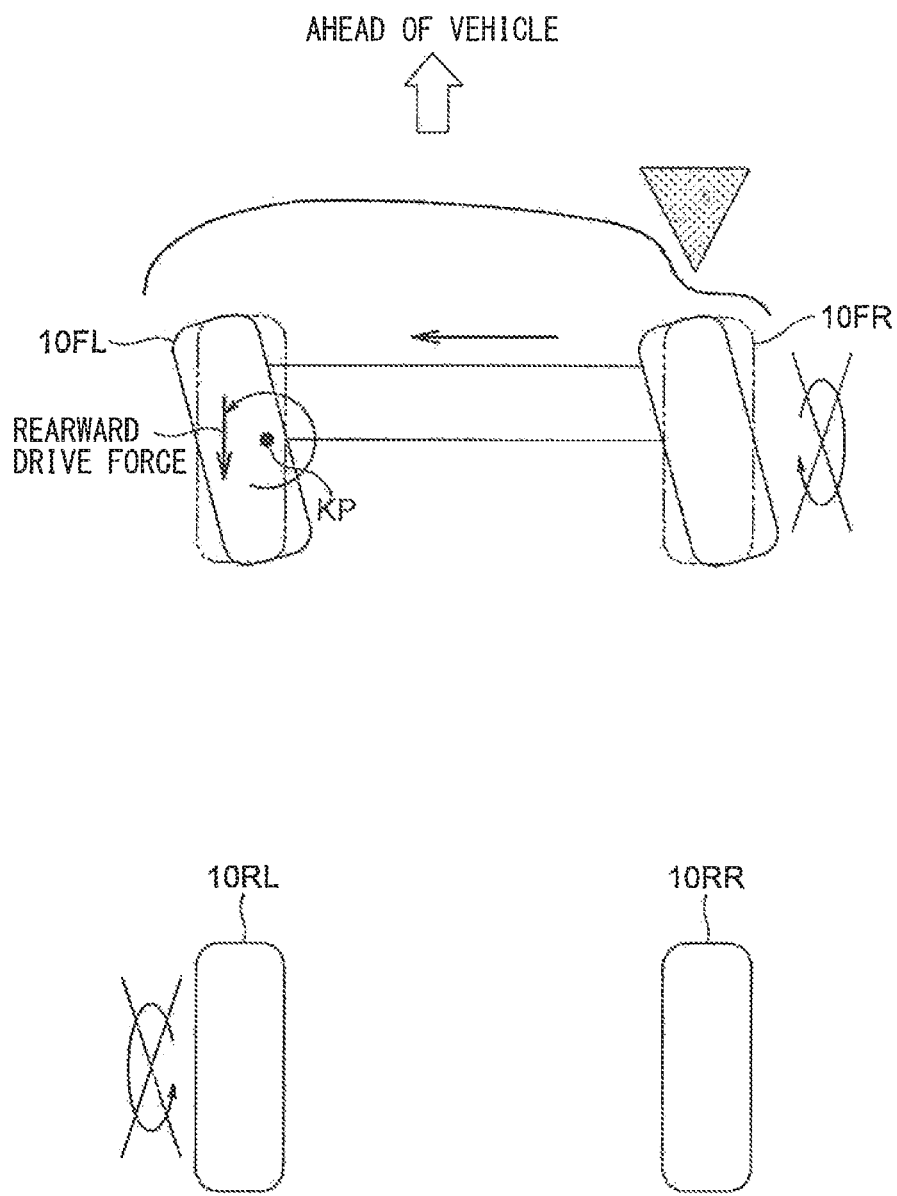
FIG. 11 describes another example working as a result of the calculation process illustrated in FIG. 9.

In contrast, referring to FIG. 11, for example, under a condition that the contact position of the vehicle with respect to the forward object is on the right side of the vehicle and the drive force transmitted to each of the left front wheel 10FL and the right front wheel 10FR is the rearward drive force, the rearward drive force may be transmitted only to the left front wheel 10FL upon application of the braking force to the right front wheel 10FR. In a precise sense, it is not likely that no drive force is transmitted to the right front wheel 10FR unless the right front wheel 10FR is locked. Accordingly, the left front wheel 10FL on which the rearward drive force acts may be so turned with the center of turning corresponding to the kingpin axis KP that the rear part of the left front wheel 10FL is oriented inward in the width direction. Upon this turning of the left front wheel 10FL, the right front wheel 10FR coupled to the left front wheel 10FL with the steering device 34 in between may be so turned that the rear part of the right front wheel 10FR is oriented outward in the width direction.

In both of the foregoing cases, the contact position of the vehicle with respect to the forward object is on the right side of the vehicle. It may be therefore preferable that the turning be so performed that the rear part of the right front wheel 10FR is oriented outward in the width direction. Accordingly, under a condition that the contact position of the vehicle with respect to the forward object is on the right side of the vehicle and the drive force is the forward drive force, the braking force may be applied to the left front wheel 10FL. Under a condition that the contact position of the vehicle with respect to the forward object is on the right side of the vehicle and the drive force is the rearward drive force, the braking force may be applied to the right front wheel 10FR. It is thereby possible, in both of the foregoing cases, to so perform the turning that the rear part of the right front wheel 10FR, which is likely to move rearward due to the load applied on the right front wheel 10FR upon the contact of the vehicle with respect to the forward object, is oriented outward in the width direction. In contrast, under a condition that the contact position of the vehicle with respect to the forward object is on the left side of the vehicle and the drive force is the forward drive force, the braking force may be applied to the right front wheel 10FR. Under a condition that the contact position of the vehicle with respect to the forward object is on the left side of the vehicle and the drive force is the rearward drive force, the braking force may be applied to the left front wheel 10FL. It is thereby possible, in both of the foregoing cases, to so perform the turning that the rear part of the left front wheel 10FL, which is likely to move rearward due to the load applied on the left front wheel 10FL upon the contact of the vehicle with respect to the forward object, is oriented outward in the width direction.

In the calculation process illustrated in FIG. 9, under a condition that the contact position of the vehicle with respect to the forward object is on the right side of the vehicle and the drive force is the forward drive force, the braking force may be applied to the left front wheel 10FL. Under a condition that the contact position of the vehicle with respect to the forward object is on the right side of the vehicle and the drive force is the rearward drive force, the braking force may be applied to the right front wheel 10FR. Under a condition that the contact position of the vehicle with respect to the forward object is on the left side of the vehicle and the drive force is the forward drive force, the braking force may be applied to the right front wheel 10FR. Under a condition that the contact position of the vehicle with respect to the forward object is on the left side of the vehicle and the drive force is the rearward drive force, the braking force may be applied to the left front wheel 10FL. The turning may be therefore so performed that the rear part of each of the left front wheel 10FL and the right front wheel 10FR, which are likely to move rearward due to the load applied to each of the left front wheel 10FL and the right front wheel 10FR upon the contact of the vehicle with respect to the forward object, is oriented outward in the width direction.

Further, in this implementation, the braking force may be applied also to one of the left rear wheel 10RL and the right rear wheel 10RR that is on the opposite side of one, of the left front wheel 10FL and the right front wheel 10FR, which is applied with the braking force. For example, when the braking force is applied to the right front wheel 10FR, the braking force may be applied also to the left rear wheel 10RL. When the braking force is applied to the left front wheel 10FL, the braking force may be applied also to the right rear wheel 10RR. Torque may be generated for the vehicle when the braking force is applied to one of the left front wheel 10FL, and the right front wheel 10FR. However, that generated torque may be suppressed when the braking force is applied to one of the left rear wheel 10RL and the right rear wheel 10RR that is on the opposite side to the one, of the left front wheel 10FL and the right front wheel 10FR, which is applied with the braking force. This makes it possible to suppress rotation of the vehicle while the torque steering control is performed. The application of the braking force to one of the left rear wheel 10RL, and the right rear wheel 10RR decreases the traveling speed of the vehicle. The load due to the contact of the vehicle with respect to the forward object may be reduced in accordance with the amount of decrease in the traveling speed of the vehicle.

Also in the calculation process illustrated in FIG. 9, as with the calculation process illustrated in FIG. 2, the braking force may be applied to all of the left front wheel 10FL, the right front wheel 10FR, the left rear wheel 10RL, and the right rear wheel 10RR before the torque steering of the left front wheel 10FL and the right front wheel 10FR is controlled. Further, while the torque steering is controlled, the braking force may be forcibly released that has been applied to one of the left front wheel 10FL and the right front wheel 10FR that is on the opposite side to the other of the left front wheel 10FL and the right front wheel 10FR that is to be turned by means of the drive force. Further, a state of operation performed on the brake by the driver may be detected. On the basis of the detection, when the brake is not operated by the driver, the braking force may be applied to the selected wheel as in steps S14 to S16. When the brake is operated by the driver, the braking force may be forcibly released that has been applied to one of the left front wheel 10FL and the right front wheel 10FR that is on the opposite side to the other of the left front wheel 10FL and the right front wheel 10FR that is to be turned by means of the drive force.

As described above, in the vehicle front-wheel turning control apparatus, the braking force may be applied to a first front wheel, i.e., one of the left front wheel 10FL and the right front wheel 10FR, when the unavoidable contact of the vehicle with respect to the forward object is detected for the vehicle in which the drive force is transmitted at least to the left front wheel 10FL and the right front wheel 10FR. This may allow braking to be performed on the first front wheel of the left front wheel 10FL and the right front wheel 10FR. Further, the drive force may act on a second front wheel, i.e., the other of the left front wheel 10FL and the right front wheel 10FR. As a result, the second front wheel of the left front wheel 10FL and the right front wheel 10FR may be likely to be turned immediately with the turning center corresponding to the kingpin axis KP. In accordance with this turning, the first front wheel of the left front wheel 10FL and the right front wheel 10FR coupled to each other with the steering device 34 in between may be turned in the same direction as that of the second front wheel of the left front wheel 10FL and the right front wheel 10FR. Accordingly, by appropriately setting which of the left front wheel 10FL and the right front wheel 10FR is to be applied with the braking force, it is possible to so perform the turning appropriately that the rear part of one, of the left front wheel 10FL and the right front wheel 10FR, which is on the side on which the vehicle comes into contact with the forward object upon occurrence of the offset contact, is oriented outward in the width direction.

Moreover, under a condition that the drive force is the forward drive force and the contact position of the vehicle with respect to the forward object is on the right side of the vehicle, application of the braking force to the left front wheel 10FL may cause the right front wheel 10FR on which the drive force acts to be so turned with the turning center corresponding to the kingpin axis KP that the rear part of the right front wheel 10FR is oriented outward in the width direction. Under a condition that the drive force is the forward drive force and the contact position of the vehicle with respect to the forward object is on the left side of the vehicle, application of the braking force to the right front wheel 10FR may cause the left front wheel 10FL on which the drive force acts to be so turned with the turning center corresponding to the kingpin axis KP that the rear part of the left front wheel 10FL is oriented outward in the width direction. Accordingly, in both of the foregoing cases, it is possible to so perform turning appropriately that the rear part of one, of the left front wheel 10FL and the right front wheel 10FR, which is on the side of contact on which the vehicle comes into contact with the forward object upon occurrence of offset contact is oriented outward in the width direction.

Moreover, under a condition that the drive force is the rearward drive force and the contact position of the vehicle with respect to the forward object is on the right side of the vehicle, application of the braking force to the right front wheel 10FR may cause the left front wheel 10FL on which the drive force acts may be so turned with the turning center corresponding to the kingpin axis KP, that the rear part of the left front wheel 10FL is oriented inward in the width direction. Further, the right front wheel 10FR coupled to the left front wheel 10FL with the steering device 34 in between may be so turned that the rear part of the right front wheel 10FR is oriented outward in the width direction.

Moreover, under a condition that the drive force is the rearward drive force and the contact position of the vehicle with respect to the forward object is on the left side of the vehicle, application of the braking force to the left front wheel 10FL may cause the right front wheel 10FR on which the drive force acts may be so turned with the turning center corresponding to the kingpin axis KP, that the rear part of the right front wheel 10FR is oriented inward in the width direction. Further, the left front wheel 10FL coupled to the right front wheel 10FR with the steering device 34 in between may be so turned that the rear part of the left front wheel 10FL is oriented outward in the width direction. Accordingly, in both of the foregoing cases, it is possible to so perform turning appropriately that the rear part of one, of the left front wheel 10FL and the right front wheel 10FR, which is on the side on which the vehicle comes into contact with the forward object upon occurrence of offset contact is oriented outward in the width direction.

Moreover, in the all-wheel-drive vehicle in which the drive force is transmitted also to the left rear wheel 10RL and the right rear wheel 10RR, application of the braking force to both of the left rear wheel 10RL and the right rear wheel 10RR may cause the drive force that is likely to be transmitted to the left rear wheel 10RL and the right rear wheel 10RR to be concentrated to the left front wheel 10FL and the right front wheel 10FR applied with no braking force. It is therefore possible to promptly achieve turning of the front wheels that utilizes the drive force.

Moreover, in the front-wheel-drive vehicle in which the drive force is transmitted only to the left front wheel 10FL and the right front wheel 10FR, the braking force may be applied to one of the left rear wheel 10RL and the right rear wheel 10RR that is on the opposite side to one, of the left front wheel 10FL and the right front wheel 10FR, which is applied with the braking force. This suppresses the torque of the vehicle generated due to application of the braking force to the one of the left front wheel 10FL and the right front wheel 10FR. It is therefore possible to suppress rotation of the vehicle.

Moreover, when the contact of the vehicle with respect to the forward object or the unavoidable contact of the vehicle with respect to the forward object is detected before application of the braking force to one of the left front wheel 10FL and the right front wheel 10FR, application of the braking force to all of the left front wheel 10FL, the right front wheel 10FR, the left rear wheel 10RL, and the right rear wheel 10RR makes it possible to decrease the traveling speed of the vehicle as much as possible before the control of turning of the front wheels is performed.

According to the vehicle front-wheel turning control apparatus of the implementations described above, when one of the contact of the vehicle with respect to the forward vehicle and the unavoidable contact of the vehicle with respect to the forward object is detected, the braking force is applied to one of the left front wheel 10FL and the right front wheel 10FR. This allows the left front wheel 10FL and the right front wheel 10FR to be turned in the same direction as each other in a short time.

Accordingly, by appropriately setting which of the left front wheel 10FL and the right front wheel 10FR is to be applied with the braking force, it is possible to appropriately turn the front wheel on the side on which the vehicle comes into contact with the forward object even upon occurrence of the offset contact.

Moreover, under a condition that the drive force transmitted to each of the left front wheel 10FL and the right front wheel 10FR is the forward drive force and the contact position of the vehicle with respect to the forward object is on the right side of the vehicle, the braking force may be applied to the left front wheel 10FL. Alternatively, under a condition that the drive force transmitted to each of the left front wheel 10FL and the right front wheel 10FR is the forward drive force and the contact position of the vehicle with respect to the forward object is on the left side of the vehicle, the braking force may be applied to the right front wheel 10FR.

Accordingly, in the former case of the forgoing two cases, the right front wheel 10FR on which the drive force acts may be so turned with the center of turning corresponding to the kingpin axis KP that the rear part of the right front wheel 10FR is oriented outward in the width direction. The kingpin axis KP may be present on inner side of the right front wheel 10FR in the width direction. In the latter case of the forgoing two cases, the left front wheel 10FL on which the drive force acts may be so turned with the center of turning corresponding to the kingpin axis KP that the rear part of the left front wheel 10FL is oriented outward in the width direction. The kingpin axis KP may be present on inner side of the left front wheel 10FL in the width direction. Accordingly, in both of the foregoing cases, it is possible to so perform turning appropriately that the rear part of the front wheel on the side on which the vehicle comes into contact with the forward object upon occurrence of the offset contact is oriented outward in the width direction.

Moreover, under a condition that the drive force transmitted to each of the left front wheel 10FL and the right front wheel 10FR is the rearward drive force and the contact position of the vehicle with respect to the forward object is on the right side of the vehicle, the braking force may be applied to the right front wheel 10FR. Alternatively, under a condition that the drive force transmitted to each of the left front wheel 10FL and the right front wheel 10FR is the rearward drive force and the contact position of the vehicle with respect to the forward object is on the left side of the vehicle, the braking force may be applied to the left front wheel 10FL.

Accordingly, in the former case of the forgoing two cases, the left front wheel 10FL on which the drive force acts may be so turned with the center of turning corresponding to the kingpin axis KP that the rear part of the left front wheel 10FL is oriented inward in the width direction. The kingpin axis KP may be present on the inner side of the left front wheel 10FL in the width direction. In addition, the right front wheel 10FR coupled to the left front wheel 10FL with the steering device 34 in between may be so turned that the rear part of the right front wheel 10FR is oriented outward in the width direction. In the latter case of the forgoing two cases, the right front wheel 10FR on which the drive force acts may be so turned with the center of turning corresponding to the kingpin axis KP that the rear part of the right front wheel 10FR is oriented inward in the width direction. The kingpin axis KP may be present on the inner side of the right front wheel 10FR in the width direction. In addition, the left front wheel 10FL coupled to the right front wheel 10FR with the steering device 34 in between may be so turned that the rear part of the left front wheel 10FL is oriented outward in the width direction. Accordingly, in both of the foregoing cases, it is possible to so perform turning appropriately that the rear part of the front wheel on the side on which the vehicle comes into contact with the forward object upon occurrence of the offset contact is oriented outward in the width direction.

Moreover, the drive force may be transmitted also to each of the left rear wheel 10RL and the right rear wheel 10RR, and the braking force may be applied also to each of the left rear wheel 10RL and the right rear wheel 10RR. In the all-wheel-drive vehicle, this may cause the drive force that is likely to be transmitted to each of the left rear wheel 10RL and the right rear wheel 10RR to be concentrated on the front wheel which is applied with no braking force. Accordingly, it is possible to promptly achieve front-wheel turning by means of the drive force.

Moreover, no drive force may be transmitted to each of the left rear wheel 10RL and the right rear wheel 10RR and the drive force may be transmitted to each of the left front wheel 10FL and the right front wheel 10FR. In addition, the braking force may be applied to one, of the left rear wheel 10RL and the right rear wheel 10RR, which is on opposite side to one, of the left front wheel 10FL and the right front wheel 10FR, to which the braking force is applied. This may allow for suppression of the torque of the vehicle that is generated due to the application of the braking force to one of the front wheels. This makes it possible to suppress rotation of the vehicle while the control is performed.

Moreover, when one of the occurred contact of the vehicle with respect to the forward object and the unavoidable contact of the vehicle with respect to the forward object is detected before the braking force is applied to one of the left front wheel 10FL and the right front wheel 10FR, the braking force may be applied to all of the left front wheel 10FL, the right front wheel 10FR the left rear wheel 10RL, and the right rear wheel 10RR. This makes it possible to decrease the traveling speed of the vehicle as much as possible before the control of turning of the front wheels is performed.

In the foregoing implementations, the front-wheel turning control may be performed when the unavoidable contact of the vehicle with respect to the forward object is detected. However, this is not limiting. Alternatively, for example, the front-wheel turning control may be performed when the contact of the vehicle with respect to the forward object is detected. In this case, occurrence of the contact of the vehicle with respect to the forward object may be determined, for example, when an output value of the acceleration sensor provided in the vehicle excesses a relatively-high threshold, when the air bag provided in the vehicle is activated, or any other situation.

Each of the engine controller 42, the transmission controller 43, and the brake controller 44 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of each of the engine controller 42, the transmission controller 43, and the brake controller 44. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the engine controller 42, the transmission controller 43, and the brake controller 44.

The technology encompasses various implementations other than the implementations described above. Accordingly, the technical scope of the technology is defined only by the elements that is recited in the appended claims and are pertinent to the description above.

The invention claimed is:

1. A vehicle front-wheel turning control apparatus for a vehicle with a left front wheel and a right front wheel, the vehicle front-wheel turning control apparatus comprising:
a drive force transmission path configured to transmit drive force at least to each of the left front wheel and the right front wheel;
a braking force controller configured to control braking force at least of the left front wheel and the right front wheel independently of each other;
a detector configured to detect one of occurred contact of the vehicle with respect to a forward object at an occurred contact position of the vehicle and unavoidable contact of the vehicle with respect to the forward object at an unavoidable contact position of the vehicle, the forward object being an object present ahead of the vehicle; and
a front-wheel turning controller configured to turn one, of the left front wheel and the right front wheel, to which the drive force is transmitted, by causing the braking force controller to apply the braking force to the one of the left front wheel and the right front wheel, on a basis of a state of the drive force transmitted to each of the left front wheel and the right front wheel and one of the occurred contact position and the unavoidable contact position, when the one of the occurred contact of the vehicle with respect to the forward object and the unavoidable contact of the vehicle with respect to the forward object is detected by the detector, wherein
the front-wheel turning controller causes the braking force controller to apply the braking force to the left front wheel under a condition that the drive force transmitted to each of the left front wheel and the right front wheel is a forward drive force and one of the occurred contact position of the vehicle and the unavoidable contact position of the vehicle is on a right side of the vehicle, and
the front-wheel turning controller causes the braking force controller to apply the braking force to the right front wheel under a condition that the drive force transmitted to each of the left front wheel and the right front wheel is the forward drive force and one of the occurred contact position of the vehicle and the unavoidable contact position of the vehicle is on a left side of the vehicle.

2. The vehicle front-wheel turning control apparatus according to claim 1, wherein
the vehicle further includes a left rear wheel and a right rear wheel,
the drive force transmission path further transmits the drive force to each of the left rear wheel and the right rear wheel, and
the front-wheel turning controller causes the braking force controller to apply the braking force to each of the left rear wheel and the right rear wheel.

3. The vehicle front-wheel turning control apparatus according to claim 2, wherein
the vehicle further includes a left rear wheel and a right rear wheel, and
the front-wheel turning controller causes the braking force controller to apply the braking force to all of the left front wheel, the right front wheel, the left rear wheel, and the right rear wheel when the one of the occurred contact of the vehicle with respect to the forward object and the unavoidable contact of the vehicle with respect to the forward object is detected by the detector before the braking force is applied to the one of the left front wheel and the right front wheel.

4. The vehicle front-wheel turning control apparatus according to claim 1, wherein
the vehicle further includes a left rear wheel and a right rear wheel,
the drive force transmission path transmits no drive force to each of the left rear wheel and the right rear wheel and transmits the drive force to each of the left front wheel and the right front wheel, and
the front-wheel turning controller causes the braking force controller to apply the braking force to one, of the left rear wheel and the right rear wheel, that is on opposite side to the one, of the left front wheel and the right front wheel, to which the braking force is applied by the braking force controller.

5. The vehicle front-wheel turning control apparatus according to claim 4, wherein
the vehicle further includes a left rear wheel and a right rear wheel, and
the front-wheel turning controller causes the braking force controller to apply the braking force to all of the left front wheel, the right front wheel, the left rear wheel, and the right rear wheel when the one of the occurred contact of the vehicle with respect to the forward object and the unavoidable contact of the vehicle with respect to the forward object is detected by the detector before the braking force is applied to the one of the left front wheel and the right front wheel.

6. The vehicle front-wheel turning control apparatus according to claim 1, wherein
the vehicle further includes a left rear wheel and a right rear wheel, and
the front-wheel turning controller causes the braking force controller to apply the braking force to all of the left front wheel, the right front wheel, the left rear wheel, and the right rear wheel when the one of the occurred contact of the vehicle with respect to the forward object and the unavoidable contact of the vehicle with respect to the forward object is detected by the detector before the braking force is applied to the one of the left front wheel and the right front wheel.

7. The vehicle front-wheel turning control apparatus according to claim 1, wherein the braking force controller is configured to apply the braking force to the one of the left front wheel and the right front wheel so that a rear part of the one of the left front wheel and the right front wheel, which is on the side of the contact position of the vehicle, is oriented outward in the width direction of the vehicle.

8. A vehicle front-wheel turning control apparatus for a vehicle with a left front wheel and a right front wheel, the vehicle front-wheel turning control apparatus comprising:
  a drive force transmission path configured to transmit drive force at least to each of the left front wheel and the right front wheel;
  a braking force controller configured to control braking force at least of the left front wheel and the right front wheel independently of each other;
  a detector configured to detect one of occurred contact of the vehicle with respect to a forward object at an occurred contact position of the vehicle and unavoidable contact of the vehicle with respect to the forward object at an unavoidable contact position of the vehicle, the forward object being an object present ahead of the vehicle; and
  a front-wheel turning controller configured to turn one, of the left front wheel and the right front wheel, to which the drive force is transmitted, by causing the braking force controller to apply the braking force to the one of the left front wheel and the right front wheel, on a basis of a state of the drive force transmitted to each of the left front wheel and the right front wheel and one of the occurred contact position and the unavoidable contact position, when the one of the occurred contact of the vehicle with respect to the forward object and the unavoidable contact of the vehicle with respect to the forward object is detected by the detector, wherein
  the front-wheel turning controller causes the braking force controller to apply the braking force to the right front wheel under a condition that the drive force transmitted to each of the left front wheel and the right front wheel is a rearward drive force and one of the occurred contact position of the vehicle and the unavoidable contact position of the vehicle is on a right side of the vehicle, and
  the front-wheel turning controller causes the braking force controller to apply the braking force to the left front wheel under a condition that the drive force transmitted to each of the left front wheel and the right front wheel is the rearward drive force and one of the occurred contact position of the vehicle and the unavoidable contact position of the vehicle is on a left side of the vehicle.

9. The vehicle front-wheel turning control apparatus according to claim 8, wherein
  the vehicle further includes a left rear wheel and a right rear wheel,
  the drive force transmission path further transmits the drive force to each of the left rear wheel and the right rear wheel, and
  the front-wheel turning controller causes the braking force controller to apply the braking force to each of the left rear wheel and the right rear wheel.

10. The vehicle front-wheel turning control apparatus according to claim 9, wherein
  the vehicle further includes a left rear wheel and a right rear wheel, and
  the front-wheel turning controller causes the braking force controller to apply the braking force to all of the left front wheel, the right front wheel, the left rear wheel, and the right rear wheel when the one of the occurred contact of the vehicle with respect to the forward object and the unavoidable contact of the vehicle with respect to the forward object is detected by the detector before the braking force is applied to the one of the left front wheel and the right front wheel.

11. The vehicle front-wheel turning control apparatus according to claim 8, wherein
  the vehicle further includes a left rear wheel and a right rear wheel,
  the drive force transmission path transmits no drive force to each of the left rear wheel and the right rear wheel and transmits the drive force to each of the left front wheel and the right front wheel, and
  the front-wheel turning controller causes the braking force controller to apply the braking force to one, of the left rear wheel and the right rear wheel, that is on opposite side to the one, of the left front wheel and the right front wheel, to which the braking force is applied by the braking force controller.

12. The vehicle front-wheel turning control apparatus according to claim 11, wherein
  the vehicle further includes a left rear wheel and a right rear wheel, and
  the front-wheel turning controller causes the braking force controller to apply the braking force to all of the left front wheel, the right front wheel, the left rear wheel, and the right rear wheel when the one of the occurred contact of the vehicle with respect to the forward object and the unavoidable contact of the vehicle with respect to the forward object is detected by the detector before the braking force is applied to the one of the left front wheel and the right front wheel.

13. The vehicle front-wheel turning control apparatus according to claim 8, wherein
  the vehicle further includes a left rear wheel and a right rear wheel, and
  the front-wheel turning controller causes the braking force controller to apply the braking force to all of the left front wheel, the right front wheel, the left rear wheel, and the right rear wheel when the one of the occurred contact of the vehicle with respect to the forward object and the unavoidable contact of the vehicle with respect to the forward object is detected by the detector before the braking force is applied to the one of the left front wheel and the right front wheel.

14. The vehicle front-wheel turning control apparatus according to claim 8, wherein the braking force controller is configured to apply the braking force to the one of the left front wheel and the right front wheel so that a rear part of the one of the left front wheel and the right front wheel, which is on the side of the contact position of the vehicle, is oriented outward in the width direction of the vehicle.

* * * * *